Patented Jan. 23, 1951

2,539,346

UNITED STATES PATENT OFFICE 2,539,346

LIFT APPARATUS

Samuel R. Feist, Wichita, Kans., assignor of one-third to Tom Harley, Jr., Wichita, Kans.

Application May 6, 1946, Serial No. 667,707

6 Claims. (Cl. 5—86)

This invention relates to a lift apparatus and it is primarily an object of the invention to provide a device of this kind for handling invalids.

It is also an object of the invention to provide a lifting and carrying apparatus of this kind which is readily portable and which is constructed in such a manner that it may be transported from one location to another with substantially complete freedom from shocks or jars to a person carried thereby.

An additional object of the invention is to provide a device of this kind wherein the lifting mechanism is of a character whereby the lifting element will be effectively held in desired selected position.

The invention consists in the details of construction and in the combination and arrangement of the several parts of my improved lift apparatus whereby certain important advantages are attained, as will be hereinafter more fully set forth.

In order that my invention may be better understood, I will now proceed to describe the same with reference to the accompanying drawings, wherein.

Figure 1:
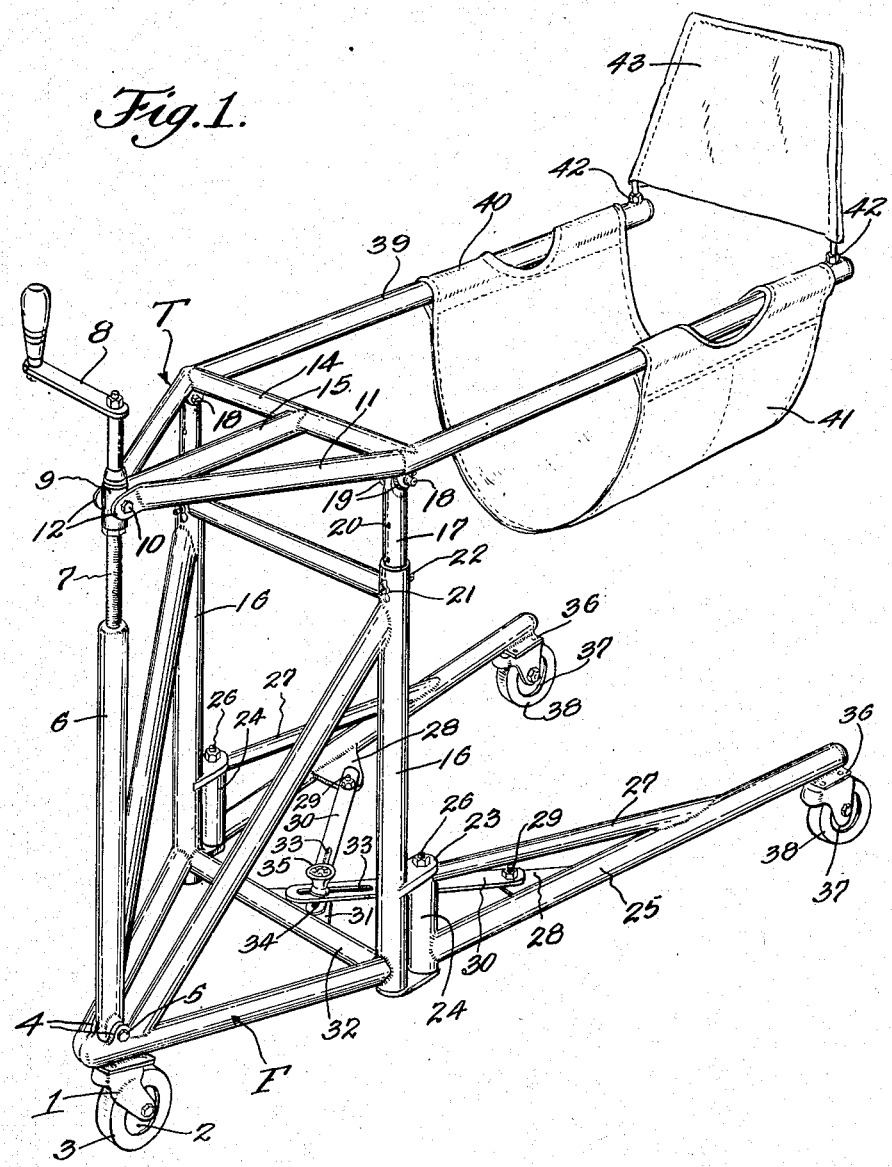
Figure 1 is a view in perspective of a lifting device constructed in accordance with an embodiment of the invention.

In the embodiment of the invention as illustrated in Figure 1, F denotes a substantially V-shaped bottom frame having its apex forwardly disposed and operatively engaged with and underlying the apex portion of the frame F is a caster structure 1 wherein the wheel 2 is provided with a rubber tire 3.

The apex portion of the frame F is provided with upstanding ears 4 between which is secured by a bolt 5 or the like the lower end portion of an upstanding tubular post 6 of desired length and in which threads from above an elongated rod 7. The upper extremity of the rod 7 is provided with means, such as a hand crank 8, whereby the rod 7 may be rotated to raise and lower the same as may be desired.

Carried by the upper portion of the rod 7 and fixed thereto is a collar 9 to each side of which is pivotally engaged, as at 10, an extremity of a side arm 11 of a top frame T. This frame T is also substantially in the form of a V with its apex portion forwardly disposed and the pivotal mountings 10 include the forwardly directed ears 12 carried by the converging extremities of the side arms 11. Interposed between the base member 14 of the frame T and the apex portion of such frame is a strengthening bar 15 which may be welded or otherwise securely held in applied position.

The rear corners of the bottom frame F have rigidly connected therewith the lower end portions of the vertically disposed tubular standards 16 in which telescopically engage from above the elongated bars 17. Each of these bars 17 is hingedly connected, as at 18, between the ears 19 depending from the rear corners of the top frame T.

The bars 17 at points spaced lengthwise thereof are provided therethrough with the openings 20 which are caused to selectively register with the aligned openings 21 in the upper portions of the standards 16 and through which registering openings are engaged a holding shank 22 of any desired character. The openings 20 and 21 through the medium of the shanks 22 allow the bar 17 to be held in desired selected vertical adjustment.

The lower portions of the standards 16 are provided with the rearwardly disposed vertically spaced rigid arms 23, said arms being two in number on each standard. Between each pair of arms 23 is engaged a tubular sleeve 24 carried by the inner end portion of an elongated straight base beam 25. This beam 25, as herein disclosed, engages the sleeve 24 at the lower portion thereof and disposed through the sleeve 24 and the beam 25 is a pintle 26, whereby the beam 25 may be laterally swung into selected adjusted position as the requirements of practice may prefer. Interposed between the upper portion of the sleeve 24 and the free end portion of the associated beam 25 is a bracing strut 27.

The beams 25 at desired points intermediate the length thereof are provided with substantially opposed and inwardly directed ears 28. To these ears 28 are pivotally connected, as at 29, the forwardly disposed rigid links 30 forwardly converging and overlying a rearwardly disposed ear 31 carried by the central portion of the rear member 32 of the base frame F.

The forward or free extremities of the links 30 are in crossed relation and said end portions are provided with longitudinally disposed slots 33 through which extends an upstanding shank 34 carried by the ear 31. Engaged with the shank 34 over the crossed portions of the links 30 is a clamping member or nut 35, whereby the beams 25 will be held in desired lateral swinging adjustment within the limitations of the slots 33. The outer or free end portions of the beams 25 carry the underhung casters 36, the wheels 37 of which are preferably provided with rubber tires 38.

The top frame T at the extremities of the base member 14 thereof is provided with the rearwardly disposed elongated parallel members 39 which are adapted to be threaded through the sheaths 40 at the end portion of a flexible seat 41. These members 39 immediately adjacent to their free ends are provided with upstanding sleeves 42 to permit engagement therewith of a back-rest 43. With the back-rest 43 removed, the seat 41 may be readily applied or removed, and when the seat 41 is removed, the device can be readily and conveniently employed as a walking aid for an invalid.

In practice, the seat 41 is properly positioned under the patient and the device then rolled into place with the bottom beams 25 either under the bed or at each side of a chair. In the placing of the device, the members 39 are threaded through the sheaths 40. The shaft 7 is then rotated to effect a downward swinging movement of the frame T, with a resultant upward swinging movement of the members 39 whereby the occupant of the seat 41 will be gently and smoothly raised to the desired height. The device with the passenger can then be moved to the destination desired. In returning the patient to a bed or chair, the foregoing operation will be reversed.

It will be noted that various of the parts can be readily separated when desired which will enable the device, when not in use, to be conveniently stored in a comparatively small space or the device can be readily carried in an automobile or other vehicle.

Figure 2:
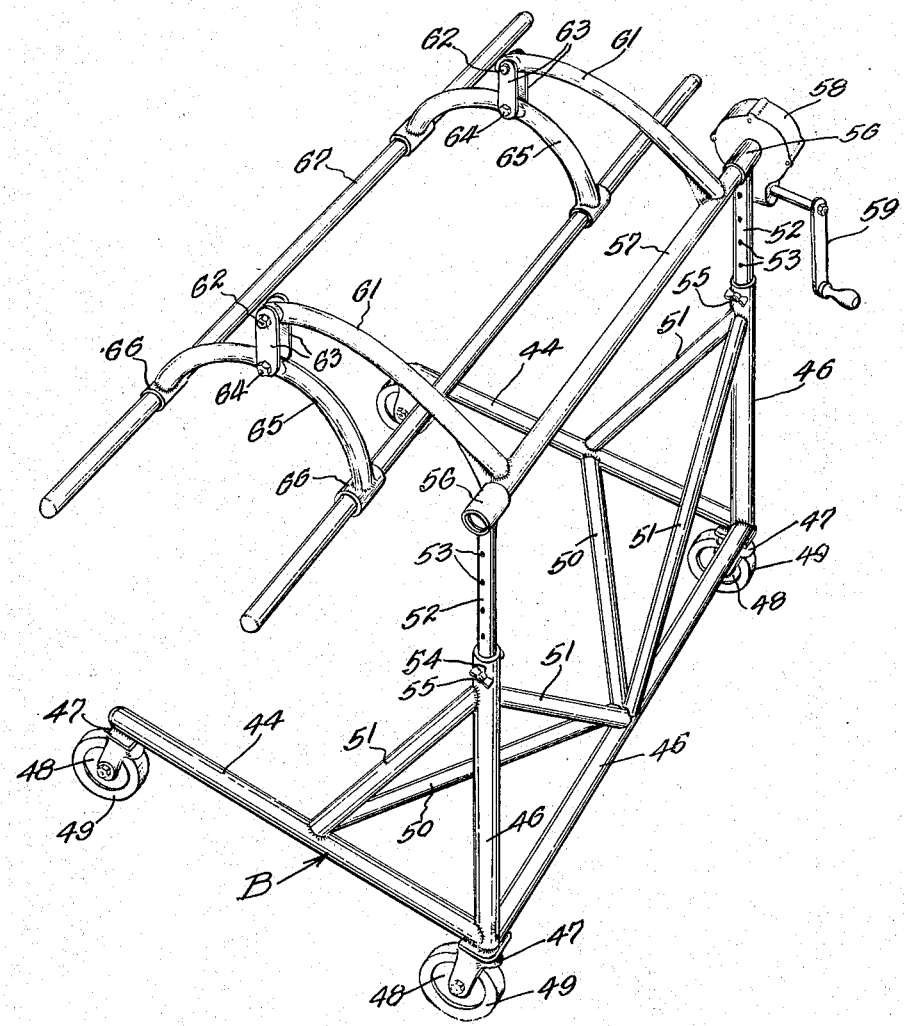
Figure 2 is a view in perspective of a lifting device constructed in accordance with another embodiment of the invention.

In Figure 2 of the drawings is illustrated an embodiment of the invention which is particularly desirable for raising and moving a patient in a prone position. In this second form, the base frame B is substantially U-shaped in form with its side arms 44 in parallelism and at right angles to the intermediate member 45 and extending upwardly from the junction of the arms 44 and intermediate member 45 are the vertically disposed tubular posts 46. The opposite end portions of the side arms 44 of the bottom frame B carry the underhung casters 47 wherein the wheels 48 are preferably provided with rubber tires 49.

Coacting with the central portion of the intermediate member 45 and the arms 44 of the base frame B are the bracing struts 50 while coacting with the upper portions of the posts 46 and the central portions of the intermediate member 45 and of the side arms 44 are the bracing members 51. Telescopically engaging from above within the posts 46 are the elongated bars 52 provided with longitudinally spaced openings 53 for selected register with the opposed openings 54 in the upper end portions of the posts 46 and through which registering openings a holding shank 55 is adapted to be passed whereby the bars 52 may be effectively held in desired selected vertical adjustment.

The upper ends of the bars 52 are provided with the aligned bearings 56 which rotatably support a shaft 57. One end portion of the shaft 57 is operatively engaged through a conventional gear assembly, as generally indicated at 58, and which assembly is herein disclosed as within a casing carried by the outer end portion of one of the bearings 56 and is manually operated by a crank 59 or otherwise as may be preferred.

Extending laterally from the shaft 57 adjacent the opposite ends thereof and in the same general direction as the side members 44 of the bottom frame B are the duplicate rock arms 26, herein disclosed as disposed on a predetermined upward curvature. The outer extremities of these arms 61 have pivotally connected, as at 62, to the opposite sides thereof the depending links 63.

The lower end portions of these links 63 are pivotally connected, as at 64, to the opposite sides of the central portions of the upwardly curved duplicate yokes 65. The extremities of these yokes are provided with the aligned sleeves 66 through which are directed the elongated and parallel bars 67. These bars 67 are adapted to have effective supporting connection as may be preferred with a patient when in a prone position and by proper rotation of the shaft 57, said patient may be readily and conveniently raised or lowered in an easy and gentle manner.

As the invention is not limited as to the means employed for effecting the desired operative support of the patient, a disclosure of any such means is believed unnecessary.

I claim:

1. A lift device of the character stated, comprising a bottom frame including a cross member, relatively long side members each attached at one end to an end of the cross member and converging elements each attached at one end to an end of the cross member to form a triangular unit of which the cross member forms the base, roller supports attached to the underside of the bottom frame, upstanding tubular members each secured at one end to an end of the cross member, an upstanding tubular member secured at one end to the convergent ends of said elements, the last named upstanding member being interiorly screw threaded at its upper end, a bar telescopically inserted into the upper end of each of the first two upstanding tubular members, a top cross member connecting the upper ends of said bars, a pair of spaced arms each secured at one end to the upper end of a bar and disposed over the side members of the bottom frame, a screw threadably inserted into the upper end of the second mentioned tubular member, means for rotating the screw, a bearing for the screw in which the screw freely rotates, and bracing arms extending from the telescopic bars to and connected with said bearing.

2. A lift device of the character described in claim 1, with hinge means connecting said side members with the cross member whereby said side members may be swung laterally on vertical axes.

3. A lift device of the character described in claim 1, with hinge means connecting said side members with the cross member whereby said side members may be swung laterally on vertical axes, bracing arms each pivotally attached at one end to a side member, said bracing arms each being longitudinally slotted at its other end, the slotted ends of the bracing arms being in overlapping relation, an upstanding shank carried by the cross member substantially midway between its ends and extending through the overlapping slotted arms, and a nut threaded onto the shank for clamping engagement with the adjacent ends of the bracing arms.

4. A lift device of the character described comprising a bottom frame including a cross member, side members each connected at one end to said frame at one end of said cross member and extending in a direction away from the frame, an underslung rotary ground engaging element carried by the frame, an underslung rotary ground engaging element carried by each side member adjacent to the end thereof remote from the frame, an upstanding tubular member carried by said frame at each end of said cross member, said tubular members being spaced apart transversely of the frame, a pair of bars each telescopically inserted into the upper end of each tubular member, horizontally spaced arms each pivotally connected at one end to one of said bars for vertical swinging and extending in the same general direction as and at an elevation above a side member, means connected with said spaced arms and positioned at the opposite side of said frame cross member from said side members for effecting vertical swinging movement of the spaced arms about their pivots, and means carried by said spaced arms for supporting a person.

5. A lift device of the character stated in claim 4, wherein the side members are mounted for lateral swinging movement, and means for holding said members in selected lateral swinging adjustment.

6. A lift device of the character described in claim 4, wherein the means for supporting a person comprises a flexible seat having opposite sides of tubular form adapted to slip over the spaced arms.

SAMUEL R. FEIST.

REFERENCES CITED

The following references are of record in the file of this patent:

UNITED STATES PATENTS

| Number | Name | Date |
| --- | --- | --- |
| 503,105 | Tingley | Aug. 8, 1893 |
| 1,349,674 | Jenkins | Aug. 17, 1920 |
| 2,218,883 | Jones | Oct. 22, 1940 |
| 2,234,483 | Sutton | Mar. 11, 1941 |
| 2,261,297 | Seib | Nov. 4, 1941 |
| 2,339,007 | Gahm | Jan. 11, 1944 |

FOREIGN PATENTS

| Number | Country | Date |
| --- | --- | --- |
| 301,958 | Great Britain | Dec. 10, 1928 |